United States Patent [19]
Gautier et al.

[11] Patent Number: 5,154,056
[45] Date of Patent: Oct. 13, 1992

[54] ASSEMBLY COMPRISING A BRAKE BOOSTER AND A MASTER CYLINDER

[75] Inventors: Jean-Pierre Gautier; Ulysse Verbo, both of Aulnay Sous Bois, France

[73] Assignee: Bendix Europe Services Techniques, Drancy, France

[21] Appl. No.: 789,395

[22] Filed: Nov. 7, 1991

Related U.S. Application Data

[63] Continuation of Ser. No. 650,103, Feb. 4, 1991.

[30] Foreign Application Priority Data

Feb. 21, 1990 [FR]  France ................. 90 02106

[51] Int. Cl.⁵ ............................................ F15B 7/00
[52] U.S. Cl. .................................... 60/533; 60/547.1; 91/374
[58] Field of Search ............................ 60/533, 547.1; 91/369.1, 369.2, 369.3, 369.4, 376 R, 374 R

[56] References Cited

U.S. PATENT DOCUMENTS

| | | | |
|---|---|---|---|
| 2,990,917 | 7/1961 | Stelzer | 91/369.4 X |
| 3,350,882 | 11/1967 | Leising | 91/369.1 X |
| 3,937,021 | 2/1976 | Sisco et al. | 91/369.3 X |
| 4,033,131 | 7/1977 | Gardner | 91/369.3 X |
| 4,091,619 | 5/1978 | Carre et al. | 60/553 |
| 4,475,444 | 10/1984 | Hendrickson | 91/376 R X |
| 4,604,870 | 8/1986 | Bach et al. | 60/551 |
| 4,984,506 | 1/1991 | Perez | 91/369.2 |
| 5,012,723 | 5/1991 | Gautier . | |

FOREIGN PATENT DOCUMENTS

| | | |
|---|---|---|
| 0159148 | 10/1985 | European Pat. Off. . |
| 1560915 | 3/1969 | France . |
| 2317533 | 2/1977 | France . |
| 2630694 | 11/1989 | France . |

*Primary Examiner*—Edward K. Look
*Assistant Examiner*—Todd Mattingly
*Attorney, Agent, or Firm*—Larry J. Palguta; Ken C. Decker

[57] ABSTRACT

The assembly comprises a brake-booster and a master cylinder having, in an outer casing (10), a space divided in leakproof fashion into a front chamber (12) and a rear chamber (14) by a movable partition (16), at least a first resilient mechanism (18) tending to displace the movable partition towards the rear chamber. The front chamber is connected to a vacuum source, and a pressure difference is established between the front and rear chambers by a valve mechanism (20) capable of connecting the rear chamber to the atmosphere upon actuation of a control rod (22) in order to displace the movable partition towards the front chamber. A master cylinder (30) is fixed on the front wall of the casing and has a bore (40) in which a tappet (42) integral with the movable partition and delimiting an enclosed space (28) in the master cylinder slides in leakproof fashion. This tappet has a bore (32) in which a reaction piston (24) subjected to the pressure of the enclosed space (28) slides in leakproof fashion. A second prestressed resilient mechanism stresses the piston towards the master cylinder.

3 Claims, 1 Drawing Sheet

ASSEMBLY COMPRISING A BRAKE BOOSTER AND A MASTER CYLINDER

This is a continuation of abandoned application Ser. No. 07/650,103 filed Feb. 4, 1991.

BACKGROUND OF THE INVENTION

The present invention relates to assemblies comprising a vacuum servomotor and a master cylinder used on motor vehicles to assist the control of braking.

Such a servomotor conventionally has, in an outer casing, a space divided in leakproof fashion into a front chamber and a rear chamber by a movable partition, at least one first resilient means tending to displace the movable partition towards the rear chamber, the front chamber being permanently subjected to a vaccum, a pressure difference being established between the front and rear chambers by a valve means capable of connecting the rear chamber to the atmosphere when the brake pedal is actuated. This pressure difference is used to displace the movable partition towards the front chamber counter to the resilient means and to actuate the pistons of a brake master cylinder. To ensure appropriate metering of the effort on the pedal, the conventional servomotors have a reaction disc in the valve means, such as that described in the document FR-A-2 630 694.

It has been proposed to replace the reaction disc, which is a wearing part, by another reaction means, as in the document FR-A-2 493 783, where the reaction means is formed by a piston controlled by the partial sum of the hydraulic pressures prevailing in the chambers of the master cylinder.

This latter system does not permit control of the development of the reaction in the course of the increase in the effort of the servomotor on the master cylinder, which is desired by motor-vehicle manufacturers, so that the pressure generated by the master cylinder does not vary as a linear function of the effort exerted on the pedal.

SUMMARY OF THE INVENTION

It is generally required that, at the beginning of braking, there should be a jump which characterizes an abrupt rise in the pressure in the master cylinder without an increase in the effort on the pedal, this jump having a well-defined value.

According to the invention, this result is obtained in the case of a hydraulic-reaction servomotor by the addition of second prestressed resilient means stressing the reaction piston towards the master cylinder. The transmission to the pedal of this reaction is thus delayed.

In this way, it will be possible for the jump to be made to correspond to the desired value.

BRIEF DESCRIPTION OF THE DRAWINGS

The invention will be better understood and other objects, advantages and features of the latter will be more clearly evident from a reading of the description which follows of a preferred embodiment given by way of nonlimitative example with reference to the drawings, in which.

By convention, the direction in which the parts are displaced when they are actuated is referred to as "front" and the direction in which the parts are displaced in order to return to their rest position is referred to as "rear". Thus, on the figure, the front end is situated on the left and the rear end is situated on the right.

DETAILED DESCRIPTION OF THE INVENTION

Figure 1:
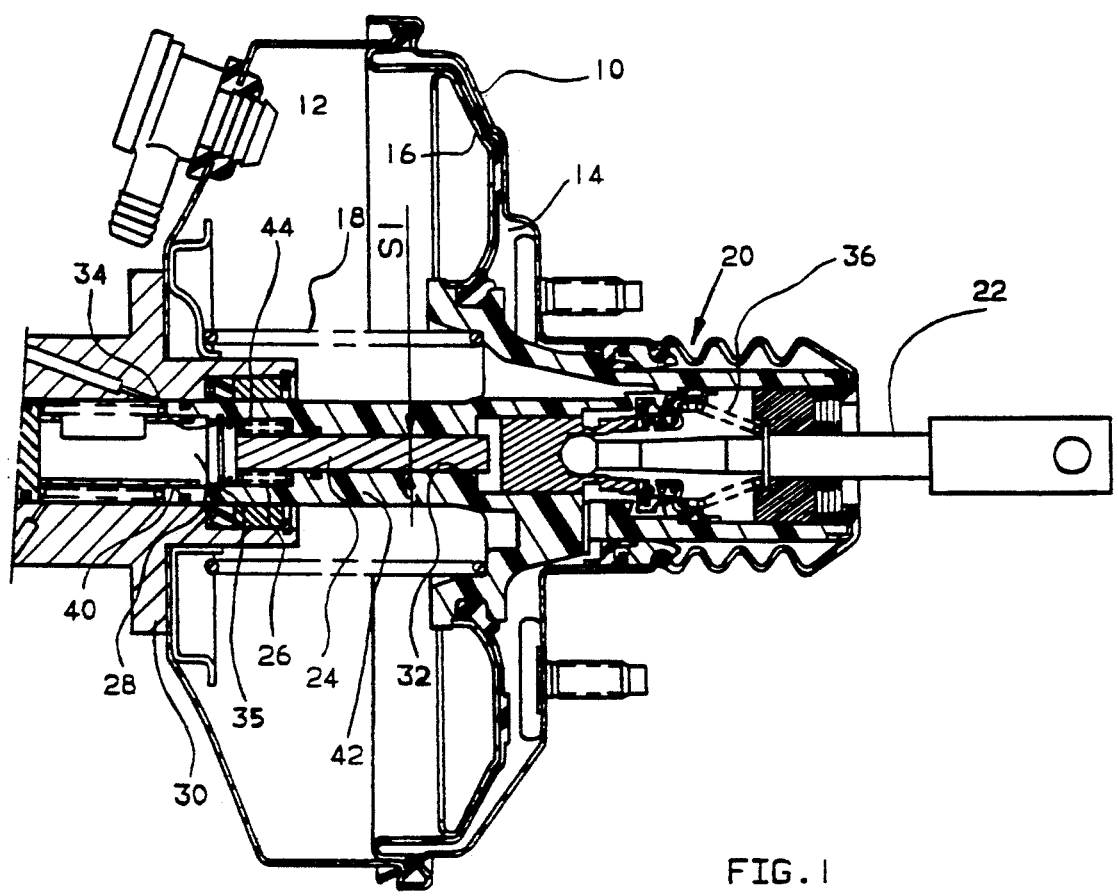
FIG. 1 represents schematically, in section, an assembly comprising a brake-booster and a master cylinder constructed in accordance with the present invention

FIG. 1 is a view of a servomotor having, in conventional fashion, an outer casing 10, the interior of which is divided into two chambers, front 12 and rear 14, by a movable partition 16, at least one first resilient means 18 tending to displace the movable partition towards the rear chamber, into its rest position.

A master cylinder 30 is fixed to the front wall of the casing and has a bore 40 in which a tappet 42 integral with the movable partition 16 and delimiting an enclosed space 28 in the master cylinder slides in leakproof fashion.

The front chamber 12 is permanently connected to a vacuum source, while a pressure difference is established between the chambers by a valve means 20 upon actuation of a control rod 22 connected to a brake pedal (not shown) in order to displace the movable partition 16 and thus produce a hydraulic pressure in the enclosed space 28 of the master cylinder 30.

The control rod is returned to the rest position by a spring 36.

A reaction piston 24 subjected to the pressure of the enclosed space 28 over its cross-section S1 slides in leakproof fashion in the tappet 42. A prestressed compression spring 26 accommodated in a stepped part 44 of the bore 32 of the tappet 42 stresses the piston towards the front, the latter being stopped in this direction by a retaining ring 34 accommodated in a recess 35 of the tappet.

The assembly functions as follows: A first effort on the pedal will serve to exceed the prestress of the spring 36 of the control rod, as illustrated by part A of the curve in FIG. 2. This part of the curve represents an increase in the effort applied to the pedal without displacement of any part of the servomotor and thus without any increase in the pressure in the master cylinder.

As the control effort increases, the valve means 20 gives rise to a pressure difference between the two chambers 12 and 14, said pressure difference causing the movable partition 16 to move forward and the pressure in the enclosed space 28 of the master cylinder to rise. In a first period, the value of this pressure in the enclosed space 28 multiplied by the cross-section S1 does not exceed the prestress of the spring 26. The reaction piston thus has no effect on the pedal until the pressure reaches a predetermined value as illustrated by part B of the curve of FIG. 2. This part conveys an increase in pressure in the master cylinder without an increase in the effort on the pedal.

As the control effort increases further, the pressure in the enclosed space 28 multiplied by the cross-section S1 reaches the prestress of the spring 26. The piston is displaced towards the rear and starts to press against the control rod 22 as illustrated by point C of the curve of FIG. 2. The size of part B represents the value of the jump.

Figure 2:
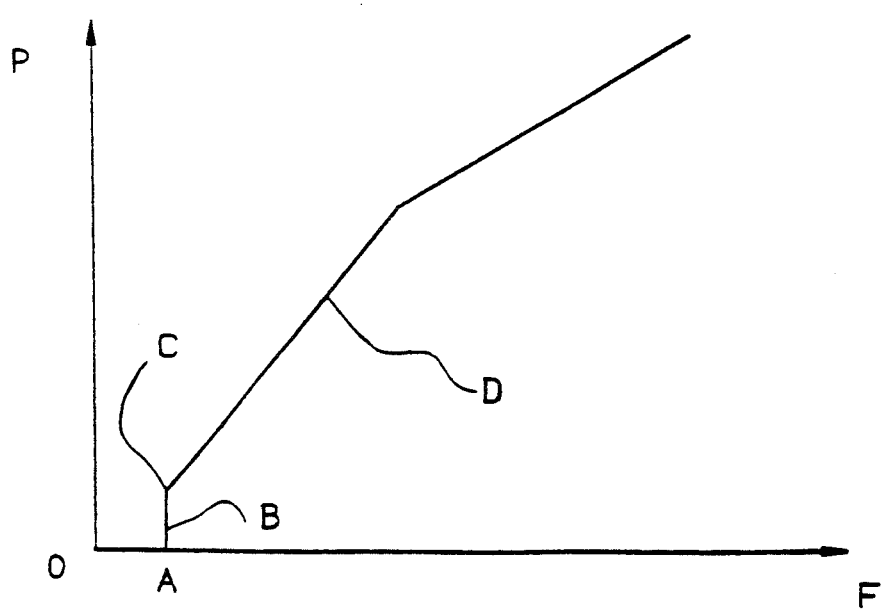
FIG. 2 represents the curve of the pressure generated by the master cylinder as a function of the effort applied to the pedal and obtained with the assembly of FIG. 1.

When the control effort increases further, the pressure in the master cylinder increases as represented by part D of the curve of FIG. 2, with a corresponding increase in the reaction.

It can be seen that, in this way, the prestress of the spring 26 makes it possible to obtain a jump of the desired value. The spring 26 could be replaced by any other resilient means, such as, for example, a stack of Belleville washers, provided that the prestress of this means can be obtained with precision.

This resilient means could likewise be placed in any manner provided that it stresses the piston 24 towards the front with the desired value.

What we claim is:

1. An assembly comprising a brake-booster and a master cylinder having, in an outer casing, a space divided in leakproof fashion into a front chamber and a rear chamber by a movable partition, at least first resilient means tending to displace the movable partition toward the rear chamber, the front chamber being connected to a vaccum source, valve means connecting the rear chamber to atmosphere upon actuation of a control rod in order to displace the movable partition toward the front chamber, the master cylinder fixed on a front wall of the casing and having a bore in which a tappet integral with the movable partition and delimiting an enclosed hydraulic space in the master cylinder slides in a leakproof fashion, the tappet having a bore in which a reaction piston subjected directly to hydraulic pressure of the enclosed hydraulic space slides in leakproof fashion, the enclosed hydraulic space located directly in front of the reaction piston, and nonelastomeric prestressed resilient means stressing said reaction piston toward the master cylinder so that the reaction piston is spaced-apart from the control rod in an at-rest position, said nonelastomeric prestressed resilient means comprising a spring, so that the reaction piston and spring effect a variable reaction force directly against the control rod during operation of the brake booster.

2. The servomotor and master-cylinder assembly according to claim 1, wherein said spring is accommodated in a stepped part of the bore of the tappet.

3. The servomotor and master-cylinder assembly according to claim 1, wherein the stepped part of the bore includes a stop against which the reaction piston is biased.

* * * * *